May 27, 1958  A. G. STIMSON ET AL  2,836,098
COSINE-CORRECTED LIGHT METERS
Filed July 6, 1953  3 Sheets-Sheet 1
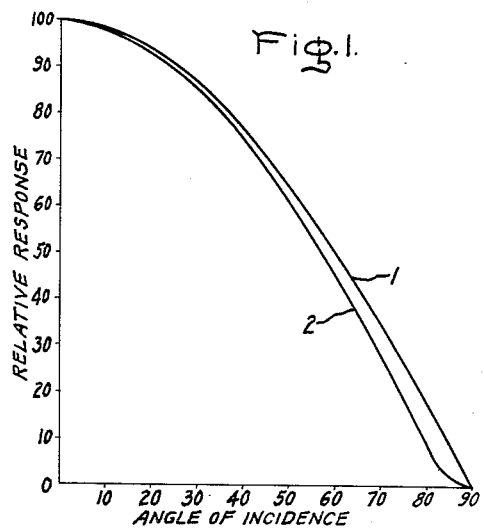
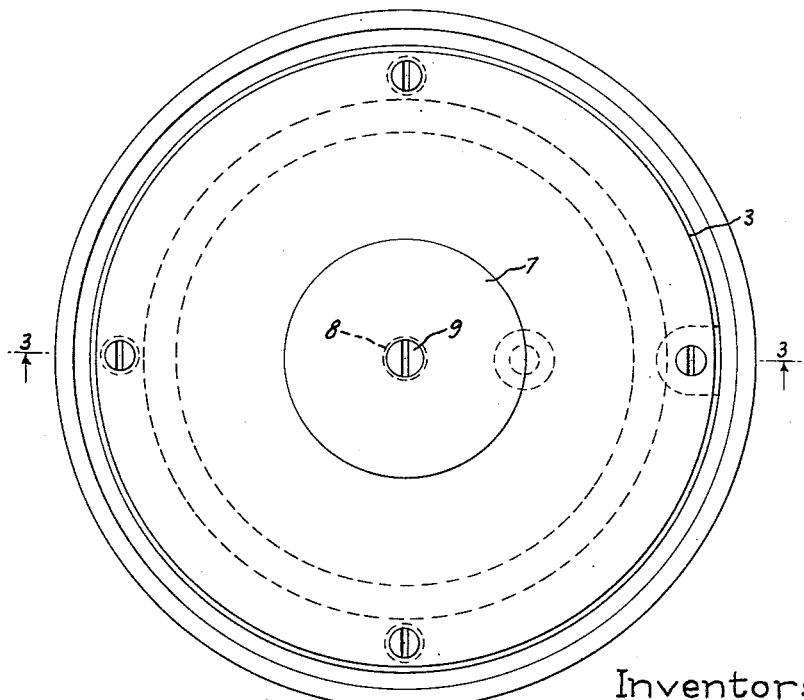
Inventors:
Allen G. Stimson,
Guy H. Wayne, Jr., Inventors:
Allen G. Stimson,
Guy H. Wayne, Jr., Inventors:
Allen G. Stimson,
Guy H. Wayne, Jr.,

United States Patent Office 2,836,098
Patented May 27, 1958

2,836,098

COSINE-CORRECTED LIGHT METERS

Allen G. Stimson, Lynnfield, and Guy H. Wayne, Jr., Swampscott, Mass., assignors to General Electric Company, a corporation of New York Application July 6, 1953, Serial No. 366,152

9 Claims. (Cl. 88—23)

Our invention relates to improved cosine-corrected light meters.

In measuring illumination with a light meter of the photovoltaic cell type, it is desirable that the response of the cell be proportional to the cosine of the angle of incidence of the illumination in accordance with Lambert's law. The response of photovoltaic cells commonly used in light meters does not accurately follow the cosine law. In general, the response of a photovoltaic cell to light rays at large angles of incidence is substantially less than the desired value, due to reflections from the surface of the cell and other causes. Consequently, to provide a meter which responds to a reasonably satisfactory degree in accordance with the cosine law of illumination, some form of correction is necessary to increase the response of the cell at large angles of incidence relative to the response at small angles of incidence. Means providing such cosine correction have previously been used, but they have not been completely satisfactory for use in mass-produced light meters due to high cost, difficulty in obtaining a uniform product, lack of durability, and the like.

The principal objects of our invention are to overcome the above disadvantages, and to provide improved light meters having simple, rugged, and easily manufactured cosine-correction means. Other objects and advantages will appear as the description proceeds.

Briefly stated, in accordance with one aspect of our invention, in combination with a cell having a disk-shaped light-sensitive surface, we provide a circular opaque mask, having a diameter substantially smaller than the cell, above the center of the light-sensitive surface and separated therefrom. This mask partially shields the light-sensitive surface of the cell from light rays at small angles of incidence, while rays at large angles of incidence pass under the mask and thus reach a larger area of the light-sensitive surface. In some embodiments of our invention, we further increase the relative response of the cell to rays at large angles of incidence by providing an inverted-cone shaped light-diffusing under surface of the mask, which reflects additional rays to the light-sensitive surface.

Our invention will be better understood from the following description taken in connection with the accompanying drawings, and its scope will be pointed out in the appended claims. In the drawings, Fig. 1 is a diagram which illustrates the actual response of a typical photovoltaic cell compared with the desired cosine-law response;

Fig. 2 is a plan view of an improved light meter embodying principles of our invention;

Referring now to Fig. 1, curve 1 illustrates the desired cosine-law response of a light meter to light rays at various angles of incidence from 0 to 90 degrees, and curve 2 illustrates the actual response of a typical selenium photovoltaic cell. It will be noted that the response of the cell at large angles of incidence is much less than the desired value. For example, at an angle of incidence of 80 degrees, the relative response of the cell is only about 50 percent of the desired value.

A much better approximation of the desired cosine-law response can be obtained by increasing the response of the cell to rays at large angles of incidence, or decreasing the response of the cell to rays at small angles of incidence, or a combination of these. In accordance with our invention, we reduce the response of the cell to rays at small angles of incidence, and may also increase the response to rays at large angles of incidence. We have built cells which show a maximum deviation of 3 percent from the correct value at angles of incidence up to 50 degrees, and 8.7 percent at angles of incidence up to 85 degrees.

Figure 3:
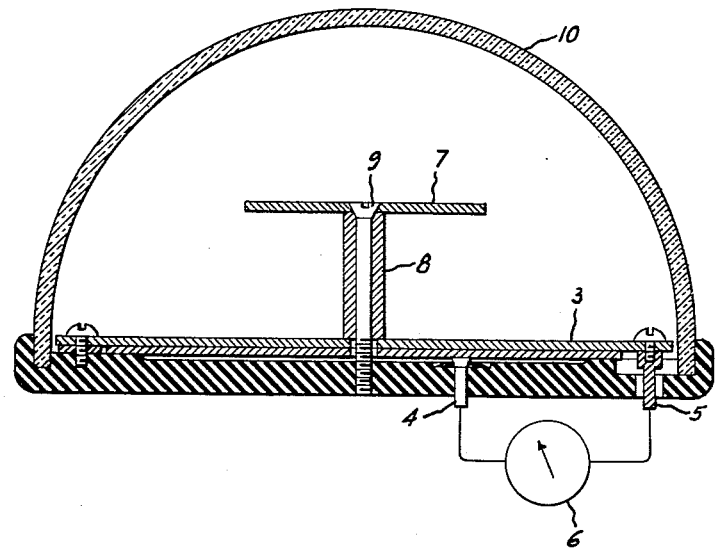
Fig. 3 is a section taken generally along the line 3—3 of Fig. 2.

Refer now to Figs. 2 and 3, which show a preferred form of light meter embodying principles of our invention. A selenium photovoltaic cell has a disk-shaped light-sensitive surface 3. Electrical terminals 4 and 5 of the photovoltaic cell are connected to an electric instrument 6 which indicates the value of the electromotive force generated by the photovoltaic cell in response to light striking its light-sensitive surface. If no cosine correction were employed, the relative indications of instrument 6 would vary with the angle of incidence of the light rays in accordance with curve 2 of Fig. 1. For a better approximation of the desired cosine-law response, the cosine correction means to be described are employed.

In Figs. 2 and 3, the cosine-correction means comprises a flat disk-shaped opaque mask 7 positioned above the center of light-sensitive surface 3 parallel thereto and separated therefrom, as shown. Disk-shaped mask 7 may be supported conveniently by a thin column 8 and held in place by a screw 9. The diameter of disk 7 is substantially smaller than the diameter of the light-sensitive surface 3; preferably, it is about 0.6 as large. The diameter of column 8 is much smaller than that of mask 7, being just large enough for a sturdy support. Mask 7 is preferably positioned above light-sensitive surface 3 a distance substantially equal to one-eighth the diameter of the light-sensitive surface.

This means of cosine correction reduces the response of the photovoltaic cell to rays at small angles of incidence, while leaving the response substantially unchanged at large angles of incidence. For example, consider light rays arriving substantially normal to the light-sensitive surface 3. Mask 7 casts a shadow over a part of the light-sensitive surface, and thus reduces the response of the cell to such rays. On the other hand, rays at large angles of incidence pass under the mask 7, and thus illuminate substantially the entire area of the light-sensitive surface.

When the diameter of the mask 7 and its distance above the light-sensitive surface are properly proportioned relative to the diameter of the cell 3, the overall response of the cell satisfactorily approximates the cosine law of illumination. Since photovoltaic cells made by different manufacturers vary somewhat in their characteristics, slight variations in the relative dimensions of the cell and the mask may be desirable to achieve optimum results. For example, the ratio of mask diameter to cell diameter may be as small as 0.5 or as large as 0.75 and the spacing between the mask and cell may be as large as ¼ the cell diameter. However, the ratios hereinbefore given are correct for a typical selenium cell, and may be used with good results with most cells commonly employed in light meters. Variations in these dimensions to achieve optimum results with different cells, or for specific uses, will generally be small.

A transparent cover 10 may be provided, if desired, to protect the light-sensitive surface. This cover is preferably hemispherical in shape, as shown, so that equal percentage amounts of the incident light are reflected by the cover at all angles of incidence. Thus, the cover does not substantially interfere with the cosine correction of the cell. The mask 7 is preferably located inside the hemispherical cover, as shown.

Figure 4:
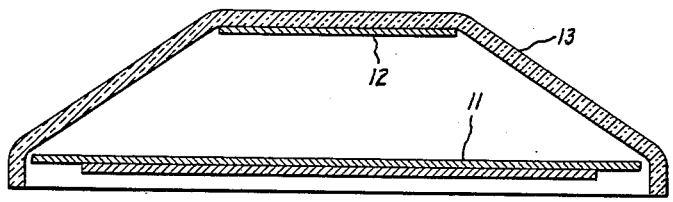
Fig. 4 is a section illustrating an alternative construction.

Fig. 4 shows an alternate construction in which the mask is combined with the cover. The photovoltaic cell has a disk-shaped light-sensitive surface 11. The opaque mask 12 is attached to, or made a part of, the generally transparent cover 13. In this case, the cover is somewhat shallower than that shown in Fig. 3, to provide the proper spacing of mask 12 above the light-sensitive surface 11. The circular mask 12 may be of any opaque material, preferably attached to the inside of cover 13; it may be a layer of paint on the cover, or it may be an opaque portion of the cover proper.

Figure 5:
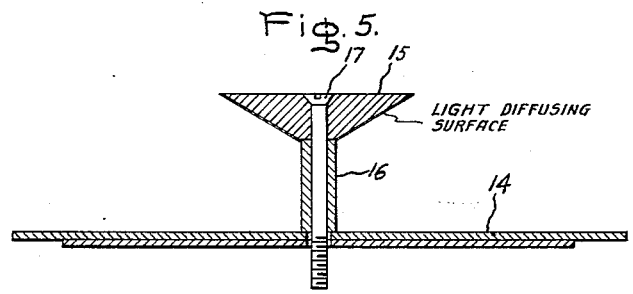
Fig. 5 is a section illustrating another alternative construction.

Fig. 5 shows an alternative means for cosine connection which not only reduces the response of the cell to light rays at small angles of incidence, as hereinbefore explained, but also increases the response of the cell to light rays at large angles of incidence. The photovoltaic cell has a disk-shaped light-sensitive surface 14. The opaque mask 15 may be supported a suitable distance above the light-sensitive surface by a slim column 16 and a screw 17, as shown. The under surface of mask 15 has substantially the shape of an inverted-cone, and this surface is made light diffusing, for example by a light-diffusing coating of flat white paint. Light rays at large angles of incidence strike the diffusing under surface of mask 15, and are thus reflected downward toward light-sensitive surface 14 at a small angle of incidence, to which the photovoltaic cell responds most efficiently. This reflected light substantially increases the response of the cell to light rays arriving at large angles of incidence. Preferably, the conical under surface of mask 15 has an apex angle of about 140 degrees.

Figure 6:
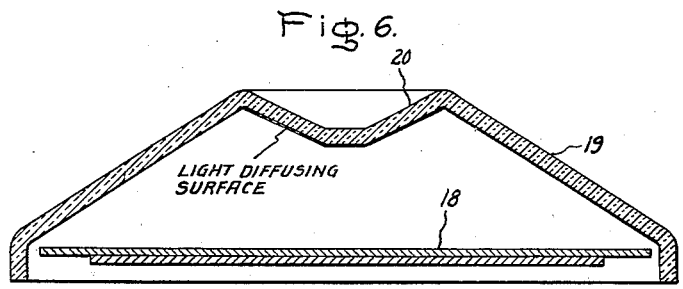
Fig. 6 is a section illustrating another alternative construction.

Fig. 6 shows still another embodiment. The photovoltaic cell has a disk-shaped light-sensitive surface 18. The generally transparent cover 19 has a central portion 20, the under surface of which is shaped as an inverted truncated cone. This inverted cone has an opaque, light-diffusing surface. For example, it may be covered with a coat of light-diffusing flat white paint. This forms a mask which operates in substantially the same manner as the mask 15 of Fig. 5. If desired, the cone may be extended to a point, rather than truncated.

Figure 7:
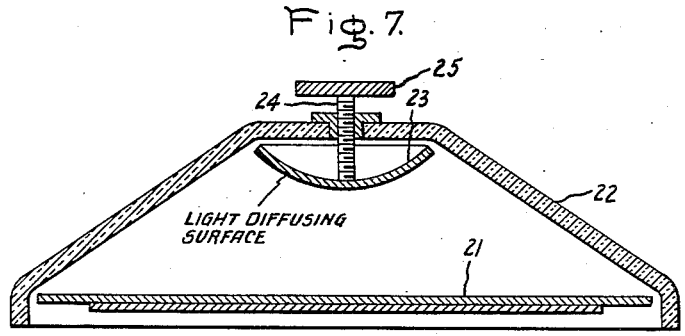
Fig. 7 is a section illustrating still another alternative construction.

The embodiment illustrated in Fig. 7 comprises a photovoltaic cell 21 and a transparent cover 2. The mask 23 is supported by a screw 24 which extends through the top of the cover to a knurled knob 25. By turning knob 25, the spacing between the mask and the cell can be adjusted to calibrate the photovoltaic cell response for optimum performance. The under surface of the mask is preferably made light diffusing, for example by a coating of flat white paint. The mask may be a flat disk or an inverted cone, as in the embodiments previously described, or may be a spherical segment, as illustrated, or may be of any other suitable shape, such as a symmetrical fragment of an ellipsoid.

It will be understood that our invention is not limited to the specific embodiments herein illustrated and described, and that the following claims are intended to cover all changes and modifications which do not depart from the true spirit and scope of the invention.

What we claim as new and desire to secure by Letters Patent of the United States is:

1. A cosine-corrected light meter for measuring illumination from a diffuse source of light having light rays directed to the meter from all directions, comprising a cell having a disk-shaped light-sensitive surface, and a circular opaque mask positioned over the center of said surface and separated therefrom, the diameter of said mask being no less than ½ and no more than ¾ the diameter of said surface, the distance of said mask over said surface being no less than ⅛ and no more than ¼ the diameter of said surface, whereby said surface is partially shielded from light rays at small angles of incidence, while rays at large angles of incidence pass under said mask and illuminate a larger area of said surface, said cell having a response proportional to the cosine of the angle of incidence of said illumination.

2. A cosine-corrected light meter for measuring illumination from a diffuse source of light having light rays directed to the meter from all directions, comprising a cell having a disk-shaped light-sensitive surface, a circular opaque mask positioned over the center of said surface and separated therefrom, the diameter of said mask being substantially 0.6 as large as the diameter of said surface, and the distance of said mask above said surface being substantially equal to ⅛ the diameter of said surface, said cell having a response proportional to the cosine of the angle of incidence of said illumination.

3. A cosine-corrected light meter for measuring illumination from a diffuse source of light having light rays directed to the meter from all directions, comprising a cell having a disk-shaped light-sensitive surface, and a flat disk-shaped opaque mask positioned over the center of said surface parallel thereto and separated therefrom, the diameter of said mask being substantially 0.6 as large as the diameter of said surface, the distance of said mask above said surface being substantially equal to ⅛ the diameter of said surface, whereby said surface is partially shielded from light rays at small angles of incidence while rays at large angles of incidence pass under said mask and illuminate a larger area of said surface, said cell having a response proportional to the cosine of the angle of incidence of said illumination.

4. A cosine-corrected light meter for measuring illumination from a diffuse source of light having light rays directed to the meter from all directions, comprising a cell having a disk-shaped light-sensitive surface, a circular opaque mask positioned over the center of said surface and separated therefrom, a column coaxial with said surface and said mask supporting said mask above said surface, the diameter of said mask being substantially 0.6 as large as the diameter of said surface and the diameter of said column being substantially smaller than the diameter of said mask, the distance of said mask above said surface being substantially equal to ⅛ the diameter of said surface, said cell having a response proportional to the cosine of the angle of incidence of said illumination.

5. A cosine-corrected light meter for measuring illumination from a diffuse source of light having light rays directed to the meter from all directions, comprising a cell having a disk-shaped light-sensitive surface, a transparent hemispherical cover over said surface, and a circular opaque mask positioned within said cover over the center of said surface and separated therefrom, the diameter of said mask being substantially 0.6 as large as the diameter of said surface and the distance of said mask above said surface being substantially equal to ⅛ the diameter of said surface, said cell having a response proportional to the cosine of the angle of incidence of said illumination.

6. A cosine-corrected light meter for measuring illumination from a diffuse source of light having light rays directed to the meter from all directions, comprising a cell having a disk-shaped light-sensitive surface, and a generally transparent cover over said surface and separated therefrom, said cover having a central circular opaque portion above the center of said surface, the diameter of said opaque portion being no less than ½ and no more than ¾ the diameter of said surface, the distance of said opaque portion over said surface being no less than ⅛ and no more than ¼ the diameter of said surface whereby said surface is partially shielded from light rays at small angles of incidence while rays at large angles of incidence pass under said opaque portion and illuminate a larger area of said surface, said cell having a response proportional to the cosine of the angle of incidence of said illumination.

7. A cosine-corrected light meter for measuring illumination from a diffuse source of light having light rays directed to the meter from all directions, comprising a cell having a disk-shaped light-sensitive surface, and an inverted cone-shaped opaque mask positioned over the center of said light-sensitive surface and separated therefrom, the under surface of said mask being light-diffusing and the diameter of said mask being no less than ½ and no more than ¾ the diameter of said light-sensitive surface, the distance of said mask over said surface being no less than ⅛ and no more than ¼ the diameter of said surface, whereby said light-sensitive surface is partially shielded from light rays at small angles of incidence while rays at large angles of incidence pass under said mask and are reflected from the light diffusing under surface thereof, thus increasing the illumination of said light-sensitive surface, said cell having a response proportional to the cosine of the angle of incidence of said illumination.

8. A cosine-corrected light meter for measuring illumination from a diffuse source of light having light rays directed to the meter from all directions, comprising a cell having a disk-shaped light-sensitive surface, and a generally transparent cover over said light-sensitive surface and separated therefrom, said cover having a central circular opaque portion above the center of said light-sensitive surface, the diameter of said opaque portion being no less than ½ and no more than ¾ the diameter of said light-sensitive surface, the distance of said opaque portion over said surface being no less than ⅛ and no more than ¼ the diameter of said surface, the under surface of said opaque portion having the shape of an inverted cone and being light-diffusing, whereby said light-sensitive surface is partially shielded from light rays at small angles of incidence, while light rays at large angles of incidence pass under said opaque portion and are reflected from the light diffusing under surface thereof, thus increasing the illumination of said light-sensitive surface, said cell having a response proportional to the cosine of the angle of incidence of said illumination.

9. A cosine-corrected light meter for measuring illumination from a diffuse source of light having light rays directed to the meter from all directions, comprising a cell having a disk-shaped light-sensitive surface, a transparent cover over said light-sensitive surface and separated therefrom, an opaque mask positioned between said cover and said surface, and a screw extending through the center of said cover and attached to said mask for adjustably supporting said mask so that the spacing between said mask and said surface is adjustable by turning said screw, said mask having the shape of a spherical segment having a diameter no less than ½ and no more than ¾ the diameter of said surface, the distance of said mask over said surface being no less than ⅛ and no more than ¼ the diameter of said surface, the convex under surface of said mask being light-diffusing, said cell having a response proportional to the cosine of the angle of incidence of said illumination.

References Cited in the file of this patent

UNITED STATES PATENTS

| | | |
|---|---|---|
| 1,954,329 | Schoenberg | Apr. 10, 1934 |
| 2,030,250 | Goodwin | Feb. 11, 1936 |
| 2,206,196 | Kubitzek | July 2, 1940 |
| 2,337,122 | Norwood | Dec. 21, 1943 |
| 2,509,366 | Perlin | May 30, 1950 |
| 2,668,246 | Burt | Feb. 2, 1954 |
| 2,674,700 | Small | Apr. 6, 1954 |